Figure 1:
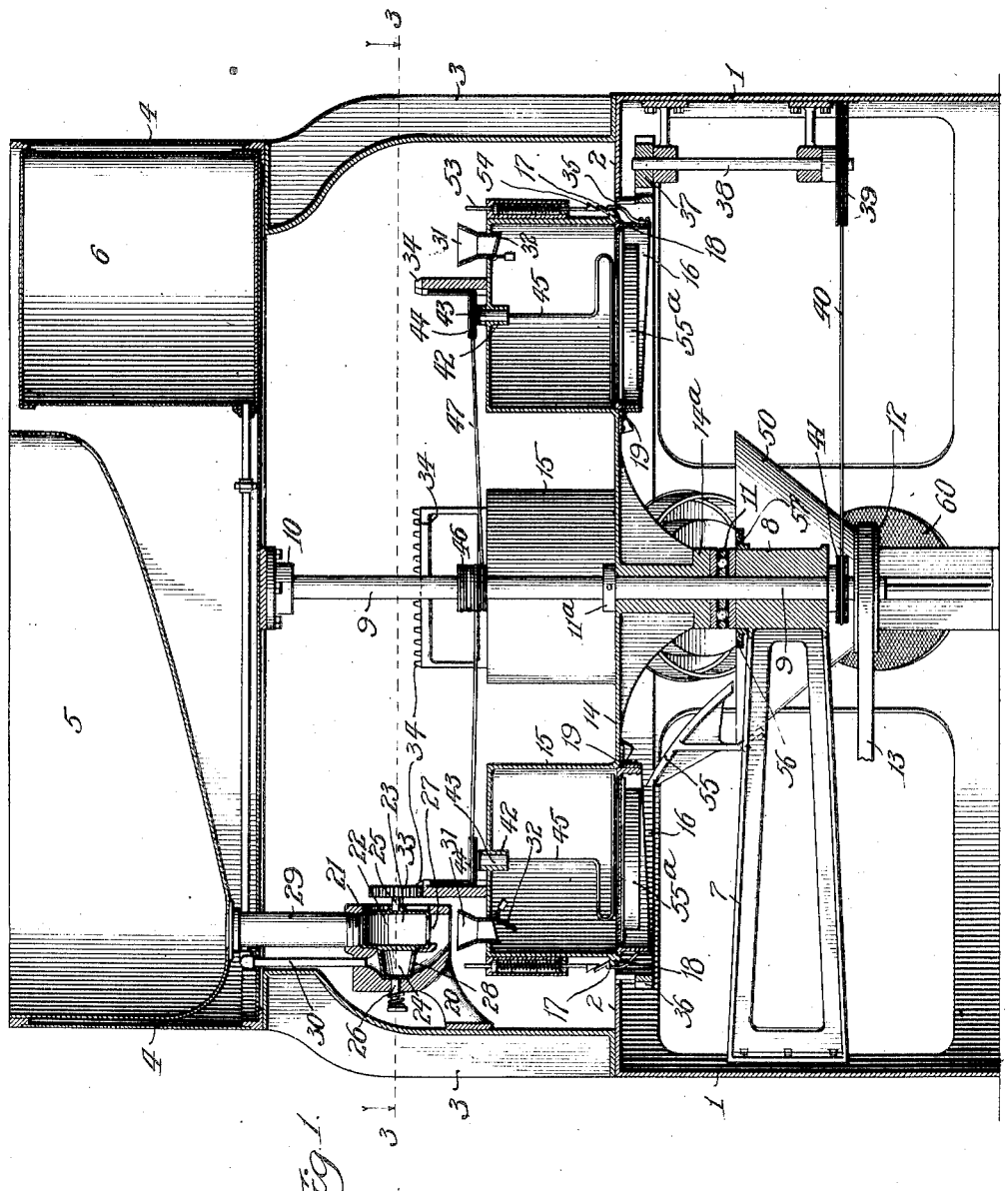

C. H. MOORES.
APPARATUS FOR POPPING CORN.
APPLICATION FILED DEC. 23, 1909.

1,009,924.

Patented Nov. 28, 1911.
4 SHEETS—SHEET 1.

Witnesses:
Geo. C. Davison
McClelland Young

Inventor:
Charles H. Moores,
By Barton & Folk,
Attys.

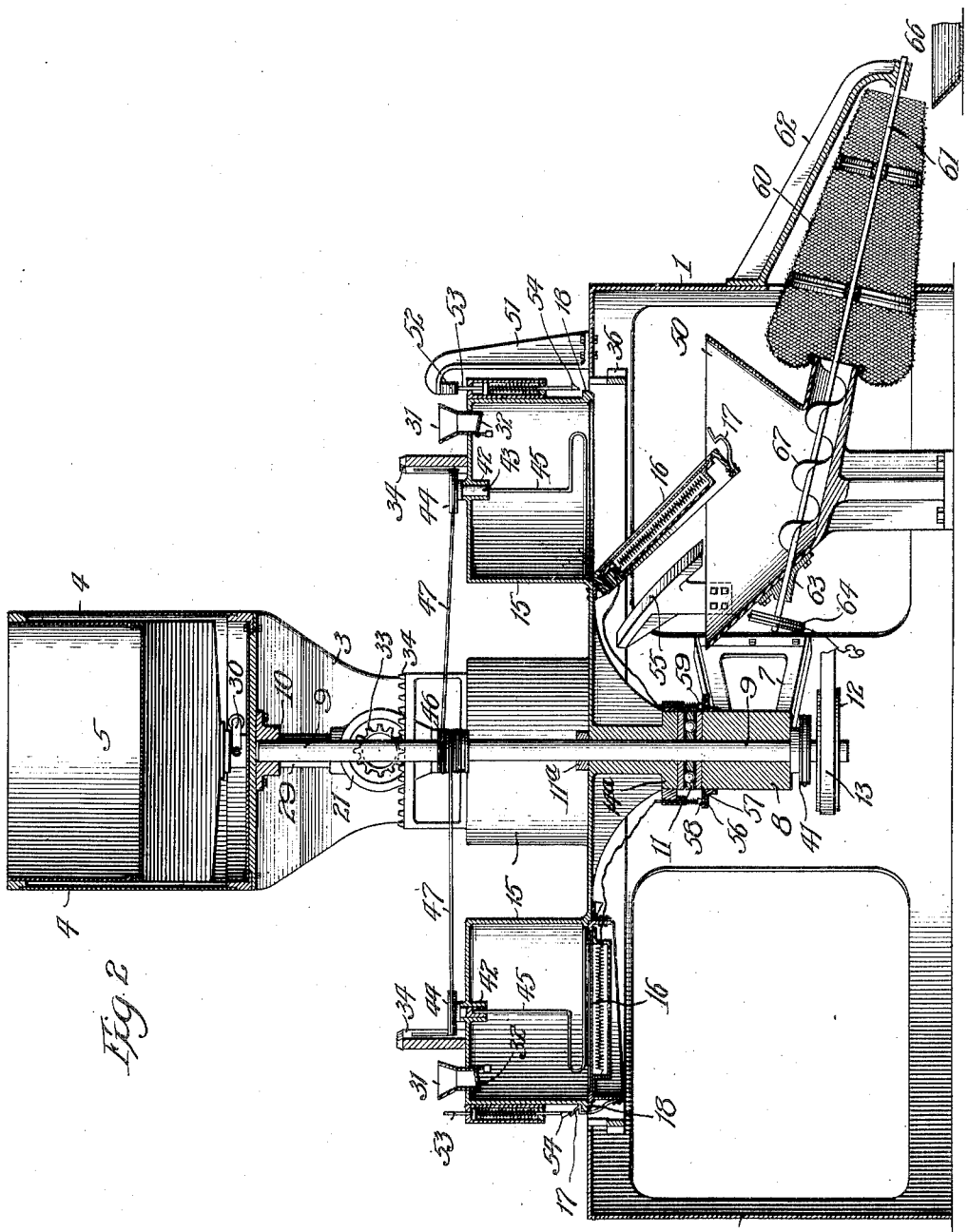

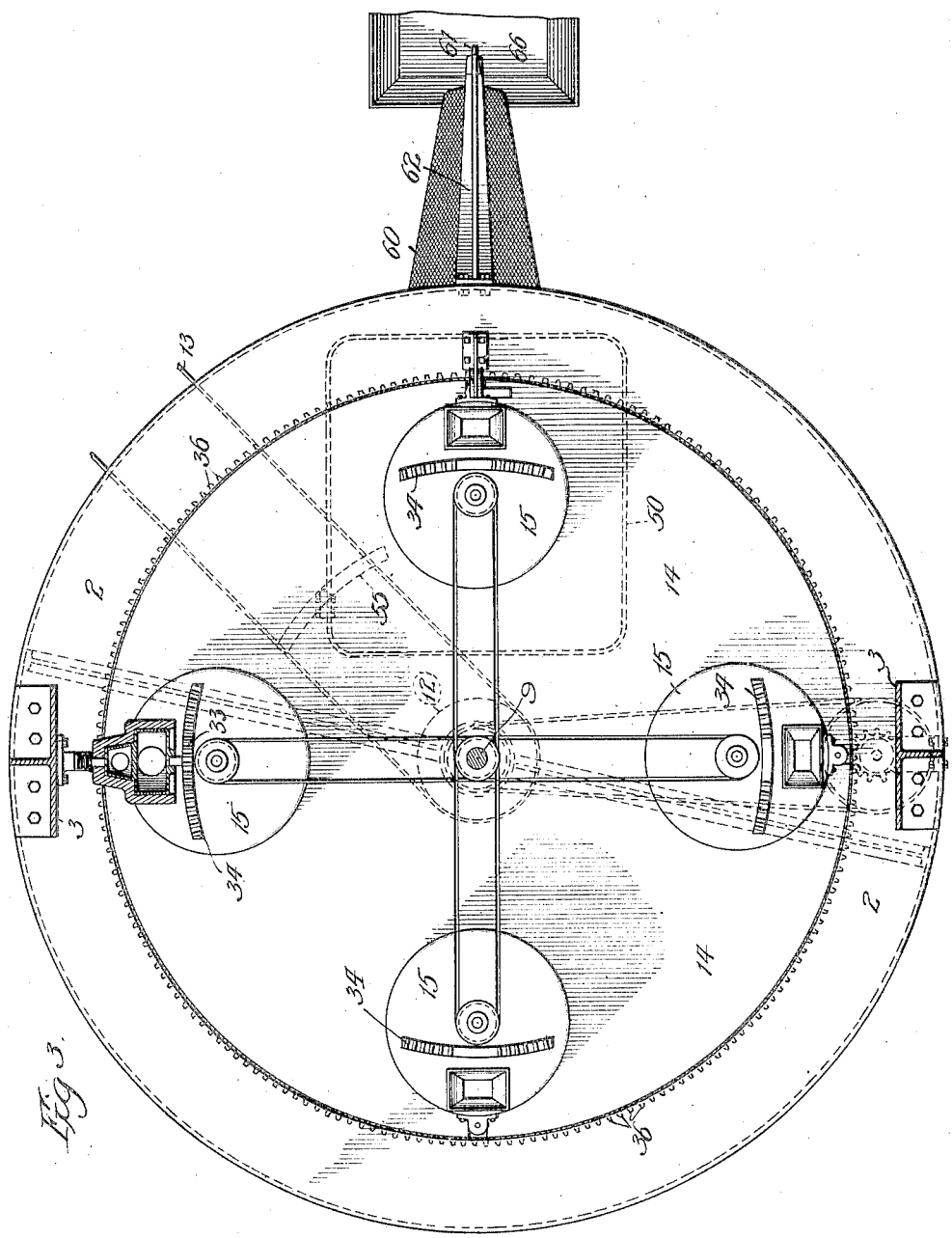

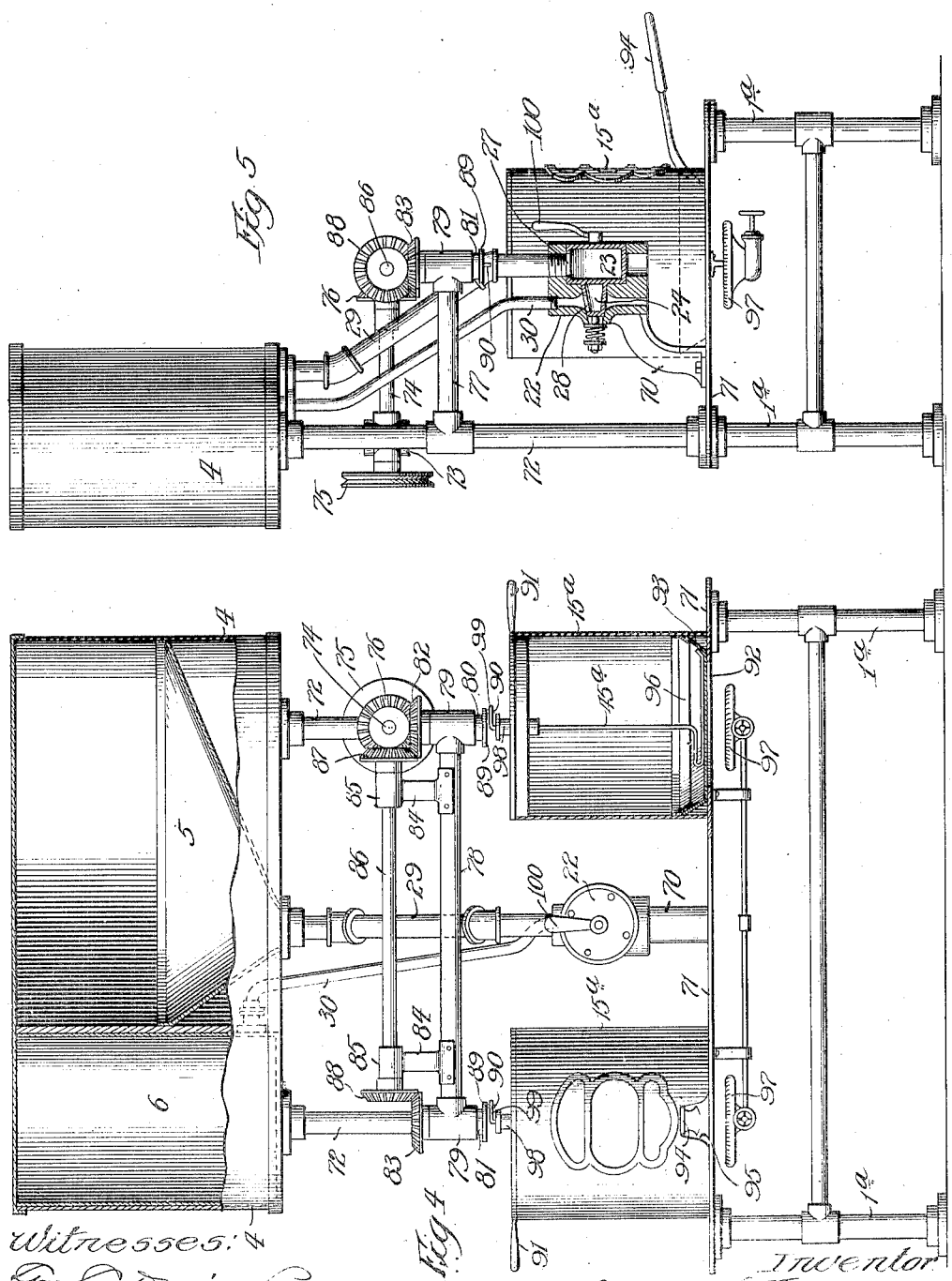

UNITED STATES PATENT OFFICE.

CHARLES H. MOORES, OF CHICAGO, ILLINOIS, ASSIGNOR OF ONE-HALF TO FRED H. GREENWOOD, OF ROCKFORD, ILLINOIS.

APPARATUS FOR POPPING CORN.

1,009,924. Specification of Letters Patent. Patented Nov. 28, 1911.

Application filed December 23, 1909. Serial No. 534,641.

*To all whom it may concern:*

Be it known that I, CHARLES H. MOORES, citizen of the United States, residing at Chicago, in the county of Cook and State of Illinois, have invented a certain new and useful Improvement in Apparatus for Popping Corn, of which the following is a full, clear, concise, and exact description.

My invention relates to a machine for popping corn, and its object is to provide apparatus for this or other similar purposes which is more or less automatic in its operation, of simple construction, which will materially increase the quality of the treated product and the quantity of output thereof.

My invention consists primarily in a novel combination of elements arranged to measure a definite amount of corn and seasoning therefor, to deliver the measured charge into a vessel to which heat is applied, provision being made for agitating or stirring the material in said vessel, and finally, after the corn has received the proper degree of such treatment, to deposit the same into an apparatus adapted for separating out the imperfect grains. The product before it is finally delivered from the machine has thus received all the treatment requisite to the production of a product of the highest quality.

Some of the elements of the combination comprising my main invention constitute in themselves novel sub-combinations capable of being used in various other arrangements and in connection with other apparatus for accomplishing the same or similar functions.

The novel features of the combination constituting my invention and the several novel elements thereof may be more readily understood by reference to the accompanying drawings in which, Figure 1 is a central vertical section of an automatic machine embodying my invention; Fig. 2 is a similar view at right angle to the view shown in Fig. 1; Fig. 3 is a sectional plan view on the line 3—3 of Fig. 1; Fig. 4 is a front elevation partly in section of a modified form of the device embodying certain features of the invention; and Fig. 5 is an end elevation partly in section and with a portion of the apparatus removed for the purpose of more clearly showing the structural details.

Similar letters of reference are used to designate similar parts throughout the several views.

Referring more particularly to Figs 1, 2 and 3, the apparatus comprises a supporting table or frame comprising a base 1 preferably circular in form and a top cut away at its central portion to form an annular shelf or table-top 2. Extending upwardly from diametrically opposite sides of the annular table 2 are standards 3, 3 on the top of which is supported a box or bin 4. Said box or bin is divided by suitable partitions into a hopper or receptacle 5 for holding the corn and a tank or receptacle 6 for holding butter, oil or other seasoning for the corn.

Extending inwardly from the base 1 are a series of spider arms or brackets 7 which terminate in a centrally located hub 8. The hub 8 forms a bearing for the lower end of a shaft 9, the upper end of which is supported in a bearing 10 mounted upon the under side of the bin 4. The lower end of the shaft 9 terminates in a pulley 12 which is arranged to be driven at any requisite speed by a band 13 connected to some suitable source of power (not shown).

Loosely mounted upon the shaft 9 within the central opening of the table and approximately level with the annular shelf or table 2 is a rotary circular table 14. The hub 14$^a$ of the table 14 rests upon a ball-bearing collar 11, of well-known construction, which is interposed between said hub 14$^a$ and the hub 8. A collar 11$^a$ is secured to the shaft 9 above the table 14, said collar preferably having a ball-bearing engagement with said table. It will be seen therefore that the shaft 9 is supported vertically upon the table 14, which in turn is supported upon hub 8, and that the shaft 9 and the table 14 have independent rotary movements.

Arranged near the circumference of the table 14 are any desired number of cylindrical vessels 15 for inclosing the corn while it is being heated and popped, there being four such vessels 15 shown in Figs. 1, 2 and 3 of the drawings, though obviously such number may be increased or diminished within reasonable bounds. The vessels 15 each consists of a cylinder of metal closed at its top and fitted at its bottom about a circular opening in the table 14. The table 14 and the vessels 15 are preferably cast in one integral piece. Each vessel 15 is provided with a bottom 16 hinged or pivoted at its inner side, as indicated at 19, and normally held closed by a spring latch 17 which engages with a catch 18 provided upon the outer periphery of the cylinder. The bottom 16 thus forms a movable door or closure for the vessel 15 and also provides a supporting surface within said vessel for the corn treated therein.

Supported in any suitable manner from the framework of the machine, as for example, from one of the standards 3, is a bracket 20 terminating in a socket piece 21 providing a seat for the rotary measuring valve 22. The valve 22 consists of two hollow receptacles 23, 24 circular in cross-section and concentrically mounted to rotate upon the axes 25, 26 projecting from the ends of said receptacles. The hollow valves 23, 24 are provided with similarly disposed mouths 27, 28, respectively, which, in one position of rotation of said valves, are brought into communication with the pipes 29 and 30, respectively. The pipe 29 leads from the corn-hopper 5 and the pipe 30 leads from the oil-tank 6, and hence the valves may be filled with corn and oil from said pipes. When the valves are turned so that the mouths thereof are opened downwardly, as shown in Fig. 1, the oil and corn held in the interior of said valve are poured therefrom into the hopper 31. The hopper 31 communicates with the interior of the vessel 15, the bottom of the hopper being normally held closed by a weighted door 32 arranged to swing open by the weight of the corn to permit the passage of the same into the vessel 15.

The axle 25 of the rotary valve 22 is provided at its outer end with a gear wheel 33 the teeth of which project to the path of a rack-bar or a series of rack-bars 34 mounted upon the top casing of each of the vessels 15. Assuming that the compartments 23 and 24 of the rotary valve 22 are in communication with the pipes 29 and 30, and hence filled with a charge of corn and seasoning, and that the table 14 is being rotated, the teeth 35 of the rack 34 engage with the teeth upon the gear wheel 33 and turn the rotary valve in such position as to empty the contents thereof into the hopper 31, as indicated in Fig. 1. One or more teeth are preferably omitted from the central portion of the rack bar 34 in order that the valves may momentarily remain in the position shown in Fig. 1, that is, in position for pouring out the contents of the valves into the hopper 31. As the table 14 continues to revolve, however, the teeth of the rack 34 again engage the gear 33 and the rotary valve 22 is returned to its initial position, that is, the valve is restored to the position in which the openings 27 and 28 thereof are in communication with the pipes 29 and 30.

The table 14 is provided at its periphery with a downwardly extending toothed flange 36, the teeth of which mesh with the toothed gear wheel 37 carried upon the upper end of the shaft 38. The lower end of the shaft 38 is provided with a pulley 39 which is connected by a belt 40 with a pulley 41 carried upon the lower end of the shaft 9. The table 14, which, as hereinbefore stated, is loosely mounted upon the shaft 9, is thus rotated from said shaft through the medium of the gear 37 and pulleys 39 and 41.

Through the top of each of the vessels 15 is a central opening, preferably flanged, as indicated at 42, through which projects a spindle 43 of a pulley 44. Secured to and projecting from the lower end of the spindle 43 is a rod 45, which rod preferably extends down to near the bottom of the vessel and is then bent to extend diametrically across the vessel near the bottom thereof. Secured to the shaft 9 at a slight distance above the level of the vessels 15 is a grooved pulley or collar 46, such pulley being provided with as many grooves as there are vessels 15. Belts 47 extend from the pulley 46 to each of the pulleys 44 and by this means the rotation of the shaft imparts a rotation to the rod 45 which thus agitates or stirs the corn lying upon the bottom 16 of the vessel 15.

Arranged beneath the rotary table 14 is a hopper 50 in position to receive the popped corn from the vessel 15 when the bottom 16 thereof is swung down, as indicated in Fig. 2. The apparatus is so constructed that the bottom is automatically dropped when in position over the hopper. With this end in view, there is mounted just above the hopper 50 on the top of the annular shelf 2 a standard 51 provided with a cam-face 52 which projects into the path of the upper end of a spring-pressed rod 53. The lower end of the rod 53 is provided with a tapered or wedge-shaped face 54, which, when the rod is pressed downward by the engagement of its upper end with the cam-surface 52, presses the spring latch 17 outward and releases it from the catch 18. The rod 53 thus acts as an automatically controlled trigger for opening the door 16. The door being thus released falls by its own weight and deposits the corn into the hopper 50. As the table 14 continues to rotate, the lower surface of the door 16 engages with a cam 55, mounted beneath the table 14 at one side of the hopper 50, which cam serves to return the door 16 to its closed position. The rod or trigger 53 having by this time been released from the cam-face 52, the spring latch 17 reëngages with its catch 18 and hence holds the door 16 in its locked position. The empty vessel 15 then rotates into position to receive a fresh supply of corn, in the manner hereinbefore described. Thus, by the rotation of the table 14 the vessels 15 successively receive a quantity of corn suitable to the capacity of said vessels and, after an interval of time sufficient for the corn to be properly treated, the vessels are emptied of their contents and advanced into position to receive a fresh supply.

The vessels 15 in which the corn is popped may be heated in any suitable manner. However, I preferably arrange electric heating coils 55ª on the under side of each of the doors 16, thus electrically heating said doors and vessels sufficiently to pop the corn. The terminals of the heating coils 55ª may be led out in any convenient manner and connected to a suitable source of power. Since the coils 55ª rotate with the table 14, I preferably mount on the fixed hub 8, two metallic rings 56, 57 insulatedly supported on said hub and forming the opposite terminals of a source of electricity (not shown). Insulatedly mounted upon the under side of the table 14 are a series of brushes 58, 59 which make contact, respectively, with the rings 56, 57. Said brushes 58, 59 are connected by suitable leads with the terminals of the heating coils 55ª.

The bottom of the hopper 50 communicates with a screen 60 which is rotatably mounted upon the shaft 61, said shaft having a bearing at one end in the bracket arm 62 attached to the frame 1, and its upper end extending through the hopper 50 near the bottom thereof and having a bearing 63 in the side wall thereof. The shaft 61 is provided on its portion which lies within the hopper 50 with a spiral feed-thread 67. One end of the shaft 61 is provided with a pulley 64 connected by a belt 65 to some suitable source of power. By the rotation of the shaft 61 the corn is thus advanced by the feed-screw 67 from the hopper 50 into the rotating screen 60. The imperfect grains of corn fall through the meshes or openings in the screen and the properly treated product passes into a vessel 66 placed beneath the mouth of the screen 60.

The bin 4 may be made of sufficient size to hold a large quantity of corn and seasoning therefor. The speed of rotation of the table 14 and the amount of heat developed in each of the vessels 15 may obviously be so controlled that exactly the right amount of time for the best treatment of the corn will elapse between the deposit of a charge of corn and seasoning into the hopper 31 as indicated at the left in Fig. 1 and the dumping of the treated charge into the hopper 50 as indicated at the right in Fig. 2. It is obvious, therefore, that after filling the receptacles 5 and 6 and connecting the pulleys 12 and 64 to a suitable source of power, the machine will automatically and without further attention on the part of the operator deliver the treated product prepared for consumption into the receptacle 66 until the supply of corn and seasoning in the receptacles 5 and 6 is exhausted.

As hereinbefore stated, I preferably cast the table 14, the vessels 15 and the flange containing the gear teeth 36 in one integral piece. The vessels 15 are preferably made of cast iron for the reason that it is desirable to have the walls thereof of sufficient thickness to retain the heat and also to prevent the condensation of vapor upon the interior of said vessels. These are important considerations, since the vapor should be highly heated in order that it may penetrate the corn and season the same without giving it a greasy coating; moreover, the condensation of the oily vapor upon the inner walls of said vessels would cause undesirable dripping of oil upon the treated product. Obviously, however, the walls of the vessels 15 may be constructed otherwise than by casting and the same results accomplished, and hence my invention is not limited in this particular.

In Figs. 4 and 5 I have shown a modification of the apparatus which is only partially automatic in its operation. In this modification of my invention, the corn-hopper 5 and oil tank 6 likewise communicate through the pipes 29 and 30 with the mouths 27 and 28 of the compartments 23 and 24, respectively, of the rotary measuring valve 22. Said valve 22 is supported upon the bracket arm 70 which is, in turn, mounted upon the top 71 of the base or supporting table-frame 1ª. In this modification of my invention the bin 4 is supported upon the end of standards 72, 72 arising from the back portion of a frame 1ª.

Mounted in suitable bearing 73, carried by one of the standards 72, is a horizontally disposed shaft 74, which shaft is provided at its rear end with a pulley 75 and at its front end with a beveled gear 76. Extending forwardly from the standards 72 are horizontally arranged bracket arms 77 connected at their front ends by a cross bar 78, said cross bar being provided at each end with a bearing 79 for the short shafts 80, 81 of the beveled gears 82, 83, respectively. Near each end of the bar 78 are uprights 84 terminating in bearings 85 for a shaft 86, the ends of which are provided with beveled gears 87 and 88, respectively.

The lower end of each of the shafts 80, 81 are provided with disks 89 and said disks are provided near their circumferences with downwardly extending pins 90. Arranged immediately underneath the disk 89 are two vessels 15ª, which, like the vessels 15 of the construction hereinbefore described, are closed at their sides and tops and open at their bottoms. Said vessels 15ª, however, are adapted to be lifted from the table 71 upon which they are supported and for this purpose are provided with handles
91. The vessels 15ª are likewise provided with stirring rods 45ª. The upper end of the stirring rod 45ª extends through a bearing 98 in the top of the vessel 15ª and is then provided with a right angular bend 99.
The bend 99 projects into the path of movement of the pin 90, and hence the rotation of the disk 89 will produce a rotation of the rod 45ª.

Each of the vessels 15ª is placed about an opening 92 in the table 71, the diameter of such opening being smaller, however, than the diameter of the vessel 15ª. Placed over said opening 92 and resting upon the table 71 is a pan 93 having a handle 94 which projects through an opening 95 near the bottom of the vessel 15ª. The pan 93 is of a size to fit the interior of the vessel 15ª, and constitutes a movable bottom closure. The vessel 15ª is preferably provided upon its interior with an annular flange 96 which extends down over the upper inner edge of the pan 93.

The underside of the pan 93 is subjected to heat from any suitable source, the usual form of gasolene burner 97 being shown in the drawing as affording such suitable heating means.

The operation of the modified form of my invention shown in Figs. 4 and 5 may be readily understood from the foregoing description, and is as follows: Assuming that the hopper 5 and the receptacle 6 contain corn and oil, respectively, a measured amount of such materials can be obtained by turning the handle 100 of the rotary valve 22. By placing the pan 93 beneath the outlet openings of said valve, a suitable supply of corn and seasoning is deposited in the pan. The vessel 15ª may readily be lifted by means of its handle 91 so that the pan 93, thus filled, can be placed about the opening 92 and within the vessel 15ª. It will be noted that the operation of inserting or withdrawing the pan 93 of one of the vessels 15ª does not interfere with the operation of the other vessel. The motion necessary for stirring the corn in the pans 93 is derived from the pulley 75 which may be connected to any suitable source of power.
The pulley 75 drives a shaft 74, and the beveled gear 76 thereof directly drives the beveled gear 82 and, through the medium of the shaft 86 and the beveled gears 87 and 88 thereof, also drives the beveled gear 83.
The rotation of the gears 82 and 83 imparts a similar motion to the disks 89, 89, the pins 90 of which engage with the bent portions 99 of the stirring rods 45ª and cause said rods to rotate and thus stir the corn in the bottom of the pan 93. It has been found that two of the vessels 15ª thus mounted will require the services of one attendant, who, while the corn is popping in one of the vessels, will be engaged in discharging the contents of the other pan and placing a fresh supply therein, at the end of which operation his attention will be required to the contents of the other vessel 15ª.

While I have thus described two modifications of my invention, one of which is wholly automatic, and the other of which is only partially so, it is obvious that the invention may be embodied in various other forms without departing from the spirit and scope thereof. It will also be understood that my invention is not limited to any particular number of vessels for heating the corn, the number of vessels, whether one or more, being dependent largely upon the intended capacity of output of the machine. It will also be understood that I do not desire to limit myself to any particular manner of applying heat to said vessels. It will also be understood that in some cases it will be found desirable to have the bottom of the vessel in the form of a pivoted door in order that the corn may be dumped by swinging said gate while in other instances it will be found more desirable to have the bottom of the vessel entirely detached from the other portion thereof, and I do not desire to be understood as limiting myself in this respect except as specifically stated in the appended claims.

What I claim is:

1. In apparatus for popping corn, the combination comprising receptacles for holding popcorn and seasoning therefor, respectively, a rotary measuring valve having two compartments, one in communication with said receptacle for corn and the other in communication with said receptacle for seasoning, means for operating said valve, a vessel for receiving a measured supply of corn and seasoning from said valve, said vessel having closed sides and top and a movable bottom, means for heating said movable bottom, means for agitating the corn contained in said vessel, and means for moving said bottom to discharge the treated product therefrom.

2. In apparatus for popping corn, the combination comprising a receptacle containing the raw-material for treatment, a measuring valve in communication with said receptacle and adapted to deliver a measured supply of said raw-material for each operation of said valve, means for operating said valve, a plurality of vessels for successively receiving a supply of raw-material measured by said valve, each of said vessels having a movable bottom for supporting said material in said vessels, means arranged to be operated from a common source of power for stirring the corn in said vessels, means for heating said vessels and their contents, and means for moving said bottoms of said vessels to discharge the treated product therefrom and to bring the same in position to receive a fresh supply from said valve.

3. In apparatus for popping corn, the combination with a table constituting the supporting frame of said apparatus, said table having an opening therein, of a cylindrical vessel having closed sides and top and having its bottom edge resting about said opening in the table, a movable bottom forming a closure for said vessel and also providing a supporting surface for corn, a rotary stirring rod extending vertically downward from the center of the top of said vessel, said rod being bent at its lower end to extend radially across the bottom of said vessel, heating means arranged immediately below said opening in the table, and means for moving the bottom closure of said vessel to discharge the treated corn therefrom.

4. In apparatus for popping corn, the combination with a table constituting the supporting frame of said apparatus, of a plurality of cylindrical vessels having closed sides and tops and supported at their bottom edges upon said table, movable bottoms forming closures for said vessels and also providing supporting surfaces within said vessels for corn, receptacles mounted upon said frame for holding a supply of popcorn and its seasoning, respectively, a rotary valve having two compartments, one in communication with said receptacle for corn and the other in communication with said receptacle for seasoning, means for operating said valve, means for moving said movable bottoms to successively discharge the treated corn therefrom and bring the same in position for receiving a fresh supply from said valve, and means for heating said vessels and their contents.

5. In a machine for popping corn, the combination with a supporting base, of a cylindrical vessel supported thereupon, said vessel having closed sides and top and a movable bottom closure constituting a support for corn, means for applying heat to said vessel through said bottom closure, a feed hopper for said vessel, a measuring valve mounted in position to supply a measured quantity of raw-material for treatment in said vessel, means for stirring the contents of said vessel, means automatically operated at predetermined intervals for moving said bottom closure of the vessel to discharge the treated contents therefrom, and means automatically operated at predetermined intervals to operate said valve and thereby to feed a fresh supply of said raw-materials into said vessel through said hopper.

6. In apparatus for popping corn, the combination with a supporting frame, of receptacles for raw-material supported upon said frame, a measuring valve arranged to supply at each operation thereof a measured amount of raw-material from said receptacles, a rotary table, a plurality of vessels supported thereupon, means for rotating said table to bring said vessels successively into position to receive the contents of said valve, means automatically controlled by the rotation of said table for discharging the contents of said valve successively into said vessels, means for heating said vessels, and means for stirring the contents of said vessels.

7. The combination with a supporting frame, of receptacles for raw-material supported upon said frame, a measuring valve arranged to supply at each operation thereof a measured amount of raw-material from said receptacles, a cylindrical vessel having closed sides and top and open at its lower end, a movable door constituting a closure for the opening at said lower end, means for heating said door, a stirring rod journaled in the center of the top of said vessel and provided at its lower end with a portion extending diametrically across the upper surface of said door, means for rotating said rod, a feed-hopper providing a passageway to the interior of said vessel, a pivoted door normally closing said passage-way, and means automatically operated at predetermined intervals to operate said valve and thereby to feed a fresh supply of said raw-materials into said vessel through said hopper.

8. In apparatus for popping corn, the combination with a vessel having closed sides and top and open at its lower end, of a pivoted door forming a closure for the opening at the lower end of said vessel, a feed-hopper communicating with the interior of said vessel, automatically operated means for feeding at predetermined intervals a measured supply of raw-material into said vessel through said hopper, means for agitating the contents of said vessel, means for heating said vessel, and automatically operated means for swinging said door at predetermined intervals to discharge the contents of said vessel.

9. In apparatus for popping corn, the combination with a rotatably mounted table having a plurality of openings in the top thereof, of a plurality of vessels having closed sides and top and having their bottom edges secured to said table about the openings therein, pivoted doors forming closures for the bottoms of said vessels, a measuring valve mounted in position to supply a measured quantity of raw-material for treatment in said vessel, means automatically controlled by the rotation of said table for discharging the contents of said valve successively into said vessels, means for agitating the contents of said vessels, and means automatically operated by the rotation of said table for swinging said doors temporarily into an open position and thereby discharging the contents of said vessels.

10. In apparatus for popping corn, the combination with a rotatably mounted table having a plurality of openings in the top thereof, of a plurality of vessels having closed sides and top and having their bottom edges secured to said table about the openings therein, pivoted doors forming closures for the bottoms of said vessels, a rotary measuring valve mounted above the path of rotation of said vessels, a receptacle for raw-material having an outlet controlled by said valve, a toothed gear wheel carried by said valve, a rack carried by each of said vessels and arranged to engage with said gear wheel, a feed-hopper mounted upon each of said vessels in position to pass underneath said valve, said hoppers having normally closed pivoted bottoms communicating with the interiors of said vessels, a latch for each of said vessels normally holding the pivoted door thereof in its closed position, a latch-releasing trigger mounted on each of said vessels, a cam arranged in the path of movement of said trigger to operate the same and thereby to release said door to permit the discharge of the treated product from said vessels, and a cam mounted beneath said rotary table in advance of said rotary valve, said cam having an upwardly inclined surface adapted to engage with the open door of the vessel and thereby to close the same.

11. In apparatus for popping corn, the combination with a circular table mounted to rotate, of a vertically disposed rotary shaft extending loosely through the center of said table, a plurality of cylindrical vessels mounted on said table near the circumference thereof, stirring rods rotatably journaled in the casing of said vessel, gear connections for driving said table and said stirring rods from said rotary shaft, a feed-supply valve, feed-hoppers carried by said vessels and arranged to be successively brought into operative relation with said valve during the rotation of said table, and mechanism automatically controlled by the rotation of said vessels for controlling the operation of said feed-supply valve.

12. In apparatus for popping corn, the combination with stationary receptacles for corn and seasoning therefor, a measuring valve for feeding a measured quantity of corn and seasoning from said receptacles, a plurality of vessels, continuous traveling mechanism for bringing said vessels successively into position to receive a feed-charge from said valve, automatically controlled means for operating said valve, means for heating said vessels and for simultaneously agitating the contents thereof, and automatically operated means for discharging the treated contents from said vessels.

13. In apparatus for popping corn, the combination with stationary receptacles for corn and seasoning therefor, a measuring valve for feeding a measured quantity of corn and seasoning from said receptacles, a plurality of vessels, continuous traveling mechanism for bringing said vessels successively into position to receive a feed-charge from said valve, automatically controlled means for operating said valve, means for heating said vessels and for simultaneously agitating the contents thereof, a rotary screen, and automatic means for discharging the treated contents from said vessels into said screen.

In witness whereof, I, hereunto subscribe my name this twenty-first day of December A. D., 1909.

CHARLES H. MOORES.

Witnesses:
 GEORGE E. FOLK,
 GEORGE L. CRAGG.